United States Patent [19]

Johnson

[11] Patent Number: 5,178,352

[45] Date of Patent: * Jan. 12, 1993

[54] INSTRUMENT SUPPORT DEVICE

[75] Inventor: Joel W. Johnson, Newport Beach, Calif.

[73] Assignee: Q-Co Industries, Inc., New York, N.Y.

[*] Notice: The portion of the term of this patent subsequent to Jan. 12, 2007 has been disclaimed.

[21] Appl. No.: 285,085

[22] Filed: Dec. 16, 1988

Related U.S. Application Data

[63] Continuation of Ser. No. 23,215, Mar. 9, 1987, abandoned.

[51] Int. Cl.⁵ .............................................. F16M 11/00
[52] U.S. Cl. .................................... 248/181; 248/187; 248/288.3
[58] Field of Search ............... 248/181, 187, 177, 349, 248/288.3, 179, 1 I, 1 H, 346; 403/90

[56] References Cited

U.S. PATENT DOCUMENTS

| | | | |
|---|---|---|---|
| 362,384 | 5/1887 | Johnson | 248/181 |
| 501,510 | 7/1893 | Hopkins et al. | 248/181 |
| 608,850 | 8/1898 | Folmer | 248/181 |
| 671,661 | 4/1901 | Slocum | 248/187 X |
| 702,018 | 6/1902 | Marbach | 248/181 X |
| 2,572,468 | 10/1951 | Gibson | 248/181 |
| 3,591,288 | 7/1971 | Aday, Jr. | 248/187 X |
| 4,019,710 | 4/1977 | O'Connor et al. | 248/288.3 X |
| 4,365,779 | 12/1982 | Bates et al. | 248/179 X |
| 4,607,990 | 8/1986 | Eggers | 248/499 X |

FOREIGN PATENT DOCUMENTS

| | | | |
|---|---|---|---|
| 46882 | 3/1889 | Fed. Rep. of Germany | 248/181 |
| 3134910 | 3/1893 | Fed. Rep. of Germany | 248/181 |
| 393899 | 4/1924 | Fed. Rep. of Germany | 248/97 |
| 1249261 | 8/1986 | U.S.S.R. | 248/181 |

Primary Examiner—Karen J. Chotkowski
Attorney, Agent, or Firm—Leydig, Voit & Mayer

[57] ABSTRACT

An instrument support device for adjustably receiving a member of a support plate having an outer spherical surface wherein the socket, formed integrally, is an outer and upper ring portion connected to an inner and lower ring portion by intercrossed ribs with upper surfaces of the ring portions and ribs defining segments of a conical surface capable of cooperating with spherical surfaces of differing radii. The lower surface of the socket forms a substantially spherical clamping surface, such that a locking knob can draw a range of spherical surfaces into a clamped relation with the conical support surface. The socket forms a tripod head by having lugs on the upper ring portion that extend out and embrace the elements of the tripod legs so that the tripod legs are mounted from the outside of their respective elements.

9 Claims, 2 Drawing Sheets

INSTRUMENT SUPPORT DEVICE

BACKGROUND

This is a continuation of a pending utility application Ser. No. 023, 215 filed Mar. 9, 1987 and now abandoned. This invention generally relates to instrument support structures such as tripod heads, and more particularly concerns a universal type leveling socket for such structures.

In U.S. Pat. No. 4,019,710, issued Apr. 26, 1977, an instrument support socket is disclosed and claimed that includes a support plate with a plurality of feet whose outer surfaces define segments of an annular surface that is a section of an external spherical surface. That spherical surface fits into a ring with a mating annular internal spherical surface. The plate can rock in the ring and, when the surfaces are drawn tightly together, the plate is firmly locked relative to the ring in the position desired.

In the commercial embodiment of this device, the radius of the spherical surfaces defined by the ring and the feet of the mounting plate was 3-½ inches. Similar competitive devices have appeared in which the support plate external spherical surfaces are of different radii, such as 50 millimeters (about 2 inches) and 75 millimeters (about 3 inches). A differing size plate does not mesh and lock well with the spherical ring configuration shown in the patent just referred to.

Accordingly, it is an object of the invention to provide a support socket of the type discussed which receives and locks well with a wide variety of mounting plate external spherical locking configurations.

Another object is to provide a support socket of the foregoing kind which is both lightweight and strong, and which, because of its construction, provides multiple locking edges for engagement with a mounting plate.

It is also an object to provide a support socket as characterized above that is an integral part of a tripod head that, for added rigidity, mounts the tripod legs from the outside of the leg elements.

SUMMARY

The support socket is an annular structure having ribs connecting an outer and upper ring portion with an inner and lower ring portion. The upper surface of the ring portions and the ribs define segments of an upwardly opening conical surface capable of receiving spherical mounting plate portions having a wide range of radii.

Tripod leg lugs are formed on the outer and upper ring portion of the support socket so that the lugs embrace and connect to the outer sides of the leg elements. Tiedown holes are formed in the lugs so that they are positioned between adjacent ones of the tripod legs.

DRAWINGS

Other objects and advantages of the invention will become apparent upon reading the following detailed description and upon reference to the drawings, in which.

DESCRIPTION

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawings, there is shown an instrument support socket 10 having an upwardly opening annular surface 11 adapted to receive instrument support plates with external spherical surfaces such as that shown in said U.S. Pat. No. 4,019,710. In the preferred embodiment, the socket 10 is mounted on a set of three tripod legs 12, 13 and 14 and it therefore forms a tripod head.

Figure 1:
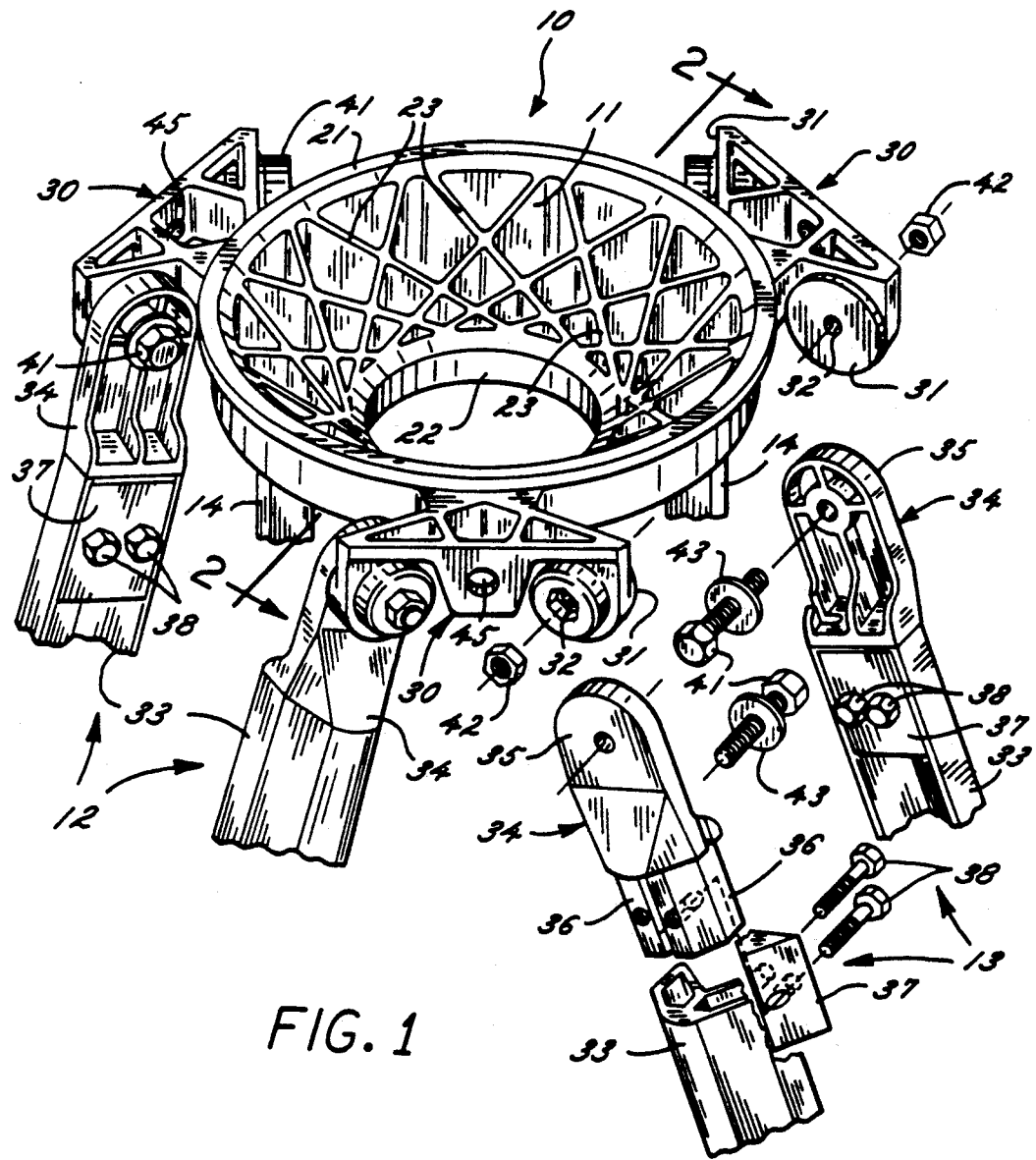
FIG. 1 is a fragmentary perspective, partially broken away, of a support socket embodying the invention shown connected to the upper portions of three tripod legs.
Figure 2:
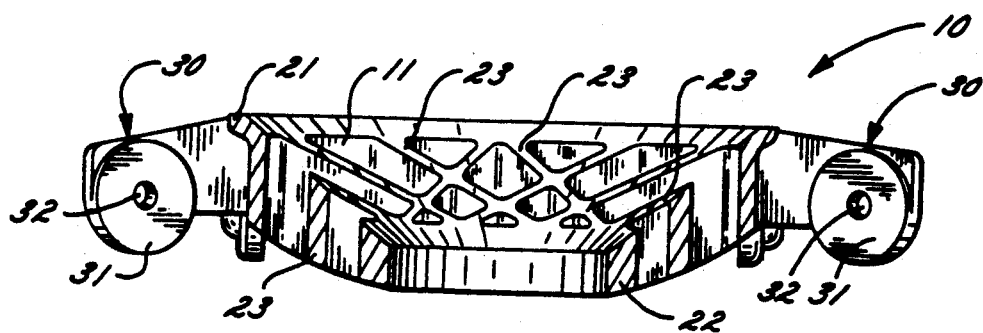
FIG. 2 is a slightly enlarged section of the support socket taken along the line 2—2 in FIG. 1.
Figure 3:
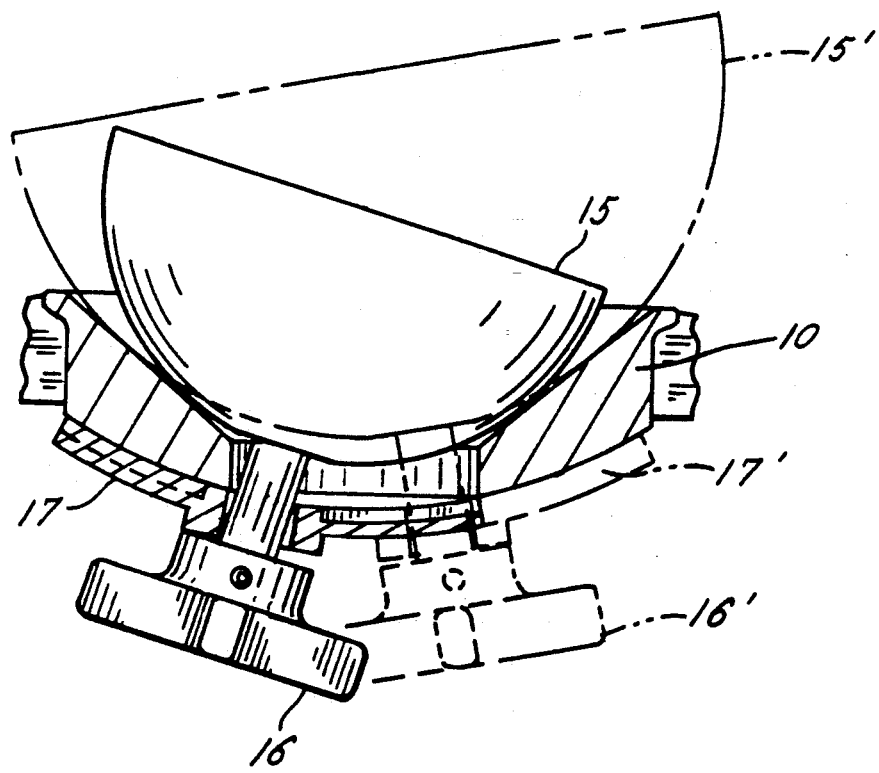
FIG. 3 is a fragmentary conceptual view of the section shown in FIG. 2.

In accordance with the invention, the socket 10 is formed of an outer and upper ring portion 21 and an inner and lower ring portion 22 which are connected by ribs 23 with the upper surfaces of the ring portions 21, 22 and ribs 23 forming the upwardly opening annular surface 11 as segments of an internal conical surface. An external spherical surface 15 will therefore fit into the surface 11 with circular line contact against the upper surfaces of the ribs 23. As shown in FIG. 3, the invention does not require the supported spherical surface 15 to have a predetermined radius. Rather, the spherical surface may have a wide range of radii as shown by the example surfaces 15 and 15'. Preferably, the ribs 23 are intercrossed and disposed in planes parallel to the vertical central axes of the ring portions 21, 22, and in the illustrated embodiment, the unit is formed as a single integral piece.

The ribs 23 not only constitute a rigid, lightweight structure, but also define a plurality of edges in the conical surface 11 to grip a spherical member 15 drawn tightly into the socket. The central opening and the lower ring portion 22 provides clearance for a locking knob 16 to interconnect with a mounting plate 17 so as to draw the mounting plate 17 spherical portion tightly against the segmented surface 11 as shown in FIG. 3—see also said patent No. 4,019,710. The openness of the ring portions 21, 22 and the open areas between the ribs 23 allows foreign material to fall freely through the socket 10 and not accumulate and thus interfere with the firm mounting of a plate in the socket. It would also be apparent that a mounting plate 17, 17' with a spherical surface 15, 15' positioned within the socket can be tilted freely so as to achieve any desired orientation as shown in FIG. 3.

To mount the socket 10 on the tripod legs 12-14, lugs 30 are formed on the upper ring portion 21 with each lug 30 having portions 31 facing the other two lugs, with the portions 31 defining mounting surfaces having central holes 32 adapted to receive elements of the tripod legs. The tripod legs 12-14 include leg elements defined by extruded members 33 receiving end pieces 34 with flanges 35 fitting against and between the surfaces 31 of adjacent lugs 30, and tongues 36 that fit down into the ends of the extrusions 33. The end pieces 34 are secured to the extrusions 33 by blocks 37 and screws 38. The lug elements 30 are secured to the leg element end pieces 34 by bolts 41, nuts 42 and washers 43.

By mounting the tripod legs from the outside of the spaced leg elements, a wider more rigid connection is obtained between the legs 12-14 and the socket 10. This also permits tiedown holes 45 to be formed in the lugs 30 between adjacent legs. Such tiedown lugs are often used to firmly tie a tripod to an underlying supporting surface and having the tiedown holes 45 outside of the tripod legs makes them more accessible and therefore easier to tie down the tripod.

I claim as my invention:

1. An instrument support socket for receiving, and locking with, elements defining an external spherical surface, comprising, an outer and upper ring portion, an inner and lower ring portion, and a plurality of ribs interconnecting said ring portions, said ribs being intercrossed and in planes parallel to the axes of said ring portions, said ring portions and said ribs being formed as one integral piece, the upper surfaces of said ring portions and said ribs defining segments of an annular upwardly opening internal conical surface capable of receiving spherical surfaces having a range of radii, the lower surfaces of said ring portions and said ribs defining segments of a downwardly directed external substantially spherical clamping surface.

2. An instrument support device comprising: (a) an instrument support socket having an outer and upper ring portion, an inner and lower ring portion, and plurality of ribs interconnecting said ring portions, the upper surfaces of said ring portions and said ribs defining segments of an annular upwardly opening internal conical surface, the ribs being intercrossed and in planes parallel to the axes of said ring portions, the lower surfaces of said ring portions and said ribs defining segments of a downwardly directed external substantially spherical clamping surface, (b) an element to be supported, said supported element having substantially the shape of a segment of a sphere with a substantially spherical lower surface, the radius of which is within a range which seats within the upwardly opening conical surface of the support socket such that said spherical lower surface of the supported element is supported on said upwardly opening conical surface of the support socket along a circular line of contact intersecting a plurality of said ribs, (c) a means for locking said supported element against movement relative to the socket, said locking means comprising a mounting plate adapted to seat against the downwardly directed external substantially spherical clamping surface of the support socket, and a means for drawing the mounting plate toward the external clamping surface of the socket and the supported element toward the internal conical surface of the socket whereby the support socket is clamped between the mounting plate and the supported element.

* * * * *